United States Patent [19]
Tambo et al.

[11] Patent Number: 5,834,149
[45] Date of Patent: Nov. 10, 1998

[54] HYDROXYGALLIUM PHTHALOCYANINE CRYSTALS AND ELECTROPHOTOGRAPHIC PHOTORECEPTORS USING SAME

[75] Inventors: Fumiaki Tambo; Katsumi Daimon; Yasuo Sakaguchi; Kazuo Yamasaki, all of Minami ashigara, Japan

[73] Assignee: Fuji Xerox Co., Ltd., Tokyo, Japan

[21] Appl. No.: 863,948

[22] Filed: May 27, 1997

Related U.S. Application Data

[63] Continuation of Ser. No. 416,000, Apr. 4, 1995, abandoned.

[30] Foreign Application Priority Data

Jun. 6, 1994 [JP] Japan .................................. 6-145733

[51] Int. Cl.$^6$ .............................. G03G 5/06; C09B 67/50; C09B 47/04
[52] U.S. Cl. .............................. 430/78; 106/413; 430/56; 540/140; 540/141; 252/501.1
[58] Field of Search ...................... 430/78, 56; 106/413; 252/501.1; 540/140, 141

[56] References Cited

U.S. PATENT DOCUMENTS

| | | |
|---|---|---|
| 2,770,629 | 11/1956 | Eastes . |
| 3,160,635 | 12/1964 | Knudsen et al. . |
| 3,357,989 | 12/1967 | Byrne et al. . |
| 3,708,292 | 1/1973 | Brach et al. . |
| 4,141,904 | 2/1979 | Cabut et al. ............................ 106/413 |
| 5,302,479 | 4/1994 | Daimon et al. .......................... 430/78 |
| 5,360,475 | 11/1994 | Nukada et al. .......................... 106/413 |
| 5,393,881 | 2/1995 | Nukada et al. .......................... 540/139 |
| 5,407,766 | 4/1995 | Mayo et al. ............................. 430/78 |

FOREIGN PATENT DOCUMENTS

| | | |
|---|---|---|
| 48-34189 | 5/1973 | Japan . |
| 49-105536 | 10/1974 | Japan . |
| 50-38543 | 4/1975 | Japan . |
| 57-148745 | 9/1982 | Japan . |
| 58-21416 | 2/1983 | Japan . |
| 59-133551 | 7/1984 | Japan . |
| 60-59354 | 4/1985 | Japan . |
| 61-151659 | 7/1986 | Japan . |
| 1-221459 | 9/1989 | Japan . |
| 3-30854 | 5/1991 | Japan . |
| 5-263007 | 10/1993 | Japan . |

OTHER PUBLICATIONS

English translation of JP 5–279591, Oct. 1993.
English translation of JP 7–53892, Feb. 1995.
"Surface Chemistries and Electronic Properties of Molecular Semiconductor Thin Films Grown By Effusion Beams", N.R. Armstrong et al., *AIP Conf. Proc.*, 1988, 167, pp. 376–385.
"Characterization of Thin Film Molecular Semiconductors Using Photoelectrochemistry and Microcircuit Photoconductivity Measurements", N.R. Armstrong et al., *Proc. Electrochem. Soc.*, vol. 88–14, 1987, pp. 267–279.
"Photoelectrochemical and Spectroscopic Characterization of Thin Films of Titanyl Phthalocyanine: Comparisons with Vanadyl Phthalocyanine", N. R. Armstrong et al., *J. Phys. Chem.*, 1987, vol. 91, pp. 5646–5651.
Mme. D. Colaitis, *Bull. Soc. Chim–France*, 1962, pp. 23–25.
"Studies of a Series of Haloaluminum, –gallium, and –indium Phthalocyanines[1]", *Inorg. Chem.*, John P. Linsky et al., 1980, vol. 19., pp. 3131–3135.
D.C.R. Acad. Sci., vol. 242, p. 1026 (1956).
IZV. Vyssh. Uchebn. Zaved Khim. Tekhnol., vol. 24, p. 1485 (1981).
Chemical Abstracts 120:334886 (1993).

*Primary Examiner*—Christopher D. Rodee
*Attorney, Agent, or Firm*—Oliff & Berridge, PLC

[57] ABSTRACT

Hydroxygallium phthalocyanine crystals and an electrophotographic photoreceptor comprising the same. The hydroxygallium phthalocyanine crystals contain at least one of a polar organic solvent selected from the group consisting of a compound having an amido group, a compound having a sulfoxide group, and an organic amine.

9 Claims, 3 Drawing Sheets

HYDROXYGALLIUM PHTHALOCYANINE CRYSTALS AND ELECTROPHOTOGRAPHIC PHOTORECEPTORS USING SAME

This is a continuation of application Ser. No. 08/416,000 filed Apr. 4, 1995 now abandoned.

FIELD OF THE INVENTION

The present invention relates to hydroxygallium phthalocyanine crystals useful as a photoconductive material and an elecrophotographic photoreceptor using the crystals.

BACKGROUND OF THE INVENTION

Recently, in an elecrophotographic photoreceptor, the requirement has been increased for extending the photosensitive wavelength region of the conventionally proposed organic photoconductive materials to wavelength region (780 to 830 nm) of a semiconductor laser emitting near infrared rays and using the organic photoconductive materials as photoreceptors for digital recording of a laser printer, etc. From the view point to achieve the requirement, squarylium compounds (JP-A-49-105536 and JP-A-58-21416), triphenylamine series trisazo compounds (JP-A-61-151659), phthalocyanine compounds (JP-A-48-34189 and JP-A-57-148745), etc., are proposed as the photoconductive materials for semiconductor lasers. (The term "JP-A" as used herein means an "unexamined published Japanese patent application")

It is generally known that in organic and inorganic semiconductors, the electric characteristics thereof are largely changed by doping with impurities. With respect to an oxytitanium phthalocyanine vapor-deposited film, the changes of the photoelectric characteristics by doping with $I_2$ or the adsorption of $P_2$, $H_2O$, etc., are reported by N. R. Armstrong, et al, in *AIP Conf. Proc.*, v. 167, p. 376–385 (1988), *Proc. Electrochem. Soc.*, vol. 88-14, p. 267 (1987), and *J. Phys. Chem.*, vol. 91, p. 5646 (1987).

In the case of using an organic photoconductive material as a photosensitive material for a semiconductor laser, it is required that the photosensitive wavelength region extends to a long wavelength region and the photoreceptor prepared by using the organic photoconductive material has a high sensitivity, a good durability, etc. However, the conventional photoconductive materials described above do not sufficiently satisfy these requirements.

For overcoming these disadvantages of the organic photoconductive materials described above, the relationship between the crystal types and the electrophotographic characteristics has been investigated, and in particular, many reports have been made on phthalocyanine compounds.

In general, it is known that a phthalocyanine compound shows many crystals types according to the differences in the production method and the treatment method thereof, and the difference in the crystal types gives a large influence on the photoelectric conversion characteristics of the phthalocyanine. It is known that copper phthalocyanine, as an example of phthalocyanine compounds, has the crystal types of α, π, χ, ρ, δ, etc., in addition to the stable β-type, and also these crystal types can be mutually converted by a mechanical strain, a sulfuric acid treatment, an organic solvent treatment, a heat treatment, etc., as described, e.g., in U.S. Pat. Nos. 2,770,629, 3,160,635, 3,708.292, and 3,357,989. JP-A-50-38543, etc. describe the electrophotographic sensitivity and the difference in the crystal type of copper phthalocyanine.

In regard to the crystal type and the electrophotographic characteristics of gallium phthalocyanine using an acid pasting method, two type of the crystal types are described in JP-A-1-221459. The inventors previously proposed 5 crystal types having excellent electrophotographic characteristics (JP-A-5-263007 and U.S. Pat. No. 5,302,479). For producing these crystals, metastable hydroxygallium phthalocyanine is prepared by employing the acid pasting method as described in *Bull. Soc. Chim. France*, p. 23 (1962), which is then subjected to a solvent transformation treatment.

Examples of the gallium phthalocyanine used in the foregoing acid pasting method include chlorogallium phthalocyanine as described, e.g., in *D.C.R. Acad. Sci.*, vol. 242, p. 1026 (1956), JP-B-3-30854, JP-A-1-221459, and *Inorg. Chem.*, vol. 19, p. 3131 (1980); bromogallium phthalocyanine as described, e.g., in JP-A-59-133551; iodogallium phthalocyanine as described, e.g., in JP-A-60-59354, etc. Oxogallium phthalocyanine described in *IZV. Vvssh. Uchebn. Zaved Khim. Tekhnol.*, vol. 24, p. 1485 (1981) and the gallium phthalocyanine synthesized using gallium alkoxide described in JP-A-4-247162 may also be used. (The term "JP-B" as used herein means an "examined published Japanese patent application")

However, in the case where hydroxygallium phthalocyanine having a specific crystal type is obtained by subjecting metastable hydroxygallium phthalocyanine to the acid pasting method as described above, and then applying thereto a solvent transformation treatment, even when the hydroxygallium phthalocyanine having the desired crystal type is obtained, there is a problem that when the hydroxygallium phthalocyanine is used as an electrophotographic photoreceptor, it is difficult to obtain an electrophotographic photoreceptor having stable and good characteristics such as electrophotographic characteristics. In particular, there is a problem that the electrophotographic photoreceptor has a low photosensitivity and a large value of a dark decay, etc.

SUMMARY OF THE INVENTION

An object of the present invention is to provide hydroxygallium phthalocyanine crystals having excellent characteristics as photoconductive materials.

Another object of the present invention is to provide an electrophotographic photoreceptor showing excellent electrophotographic characteristics.

Other objects and effects of the present invention will be apparent from the following description.

As the result of various investigations, the inventors have found that in the hydroxygallium phthalocyanine crystals having distinct diffraction peaks at the specific Bragg angle in the X-ray diffraction spectrum obtained by carrying out the acid pasting method and the solvent transformation treatment, the hydroxygallium phthalocyanine crystals containing a specific polar organic solvent have excellent characteristics. Thus the present invention has been accomplished.

The present invention relates to hydroxygallium phthalocyanine crystals containing at least one of a polar organic solvent selected from the group consisting of a compound having an amido group, a compound having a sulfoxide group, and an organic amine.

The present invention also relates to an electrophotographic photoreceptor comprising an electroconductive support having thereon a photosensitive layer, said photosensitive layer comprising hydroxygallium phthalocyanine crystals containing at least one of a polar organic solvent selected from the group consisting of a compound having an amido group, a compound having a sulfoxide group, and an organic amine, as a charge generating material.

DETAILED DESCRIPTION OF THE INVENTION

Figure 1:
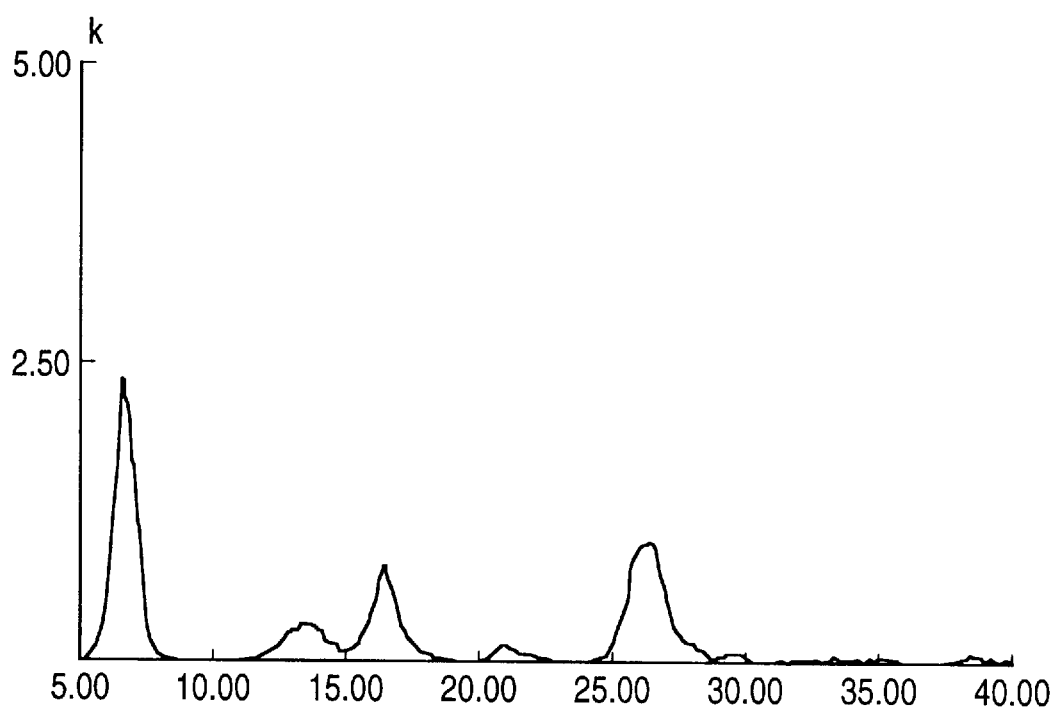
FIG. 1 shows the powder X-ray diffraction spectrum of the hydroxygallium phthalocyanine crystals used as a raw material in Examples.

The hydroxygallium phthalocyanine crystals of the present invention can be obtained by acid pasting a gallium phthalocyanine as a raw material to provide a hydroxygallium phthalocyanine and, thereafter, applying thereto a solvent incorporation treatment for a long period of time with at least one kind of a polar organic solvent selected from a compound having an amido group (such as N,N-dimethylformamide, dimethyl sulfoxide, morpholine, etc.), a compound having a sulfoxide group, and an organic amine.

Examples of the gallium phthalocyanine used as a raw material in the present invention include chlorogallium phthalocyanine, bromogallium phthalocyanine, iodogallium phthalocyanine, etc., but there is no restriction on the ligand on gallium. These gallium phthalocyanines can be synthesized by known methods. The gallium phthalocyanine synthesized using gallium trialkoxide, as described in JP-A-6-73299 can also be used. Furthermore, halogenated phthalocyanines, in which the phthalocyanine ring is halogenated, are produced depending on the production method, and these halogenated gallium phthalocyanines may be used in the present invention.

An embodiment of a process for producing the hydroxygallium phthalocyanine of the present invention is described in detail below, but the present invention is not construed as being limited thereto.

An acid paste solution of the gallium phthalocyanine is prepared, and acid pasting is carried out by adding the acid paste solution to an alkaline aqueous solution or a mixed solution of an alkaline aqueous solution and an organic solvent.

Examples of the acid used for preparing the acid paste solution of the gallium phthalocyanine include sulfuric acid, hydrochloric acid, hydrobromic acid, trifluoroacetic acid, etc., and concentrated sulfuric acid is preferred since the solubility is high and the acid can be easily handled. In the case of using concentrated sulfuric acid, the acid is generally used in the range of from 5 to 100 times by weight, preferably from 15 to 40 times by weight, the amount of the gallium phthlocyanine.

Examples of the alkali being used for an alkaline aqueous solution include sodium hydroxide, potassium hydroxide, sodium carbonate, potassium carbonate, ammonia, ammonia hydroxide, etc. Examples of the organic solvent which may be mixed with the alkaline aqueous solution include alcohols such as methanol; glycols such as ethylene glycol, glycerol, polyethylene glycol; ketones such as acetone, methyl ethyl ketone; esters such as ethyl acetate, butyl acetate; halogenated hydrocarbons such as dichloromethane, chloroform; aromatic hydrocarbons such as toluene, xylene. The amount of the organic solvent is generally in the range of not more than 10 times by weight, preferably not more than 5 times by weight, the amount of water.

The acid pasting can be carried out by adding the acid paste solution described above to the alkaline aqueous solution or the mixed solution of an alkaline aqueous solution and an organic solvent with stirring and mixing at a temperature range of from −15° C. to 100° C. When the mixed solution of an alkaline aqueous solution and an organic solvent is used, it is preferred to carry out the acid pasting at a temperature of not higher than the boiling point of the organic solvent mixed with the alkaline aqueous solution.

The amount of the alkaline aqueous solution or the mixed solution is generally in the range of from 1 to 100 times by weight, and preferably from 3 to 20 times by weight, the amount of the acid paste solution of the gallium phthalocyanine.

By carrying out the acid pasting as described above, hydroxygallium phthalocyanine crystals are formed, which are then are purified by washing with water, whereby the hydroxygallium phthalocyanine crystals having distinct peaks at 6.9°, 13.2° to 14.2°, 16.5°, and 26.4° or 7.0°, 13.4°, 16.6°, 26.0°, and 26.7° of the Bragg angle (2θ±0.2°) to the CuKα characteristics in the X-ray diffraction spectrum are obtained. The phthalocyanine may be the hydroxygallium phthalocyanine, the phthalocyanine ring of which is halogenated.

The hydroxygallium phothalocyanine crystals thus obtained are then subjected to a solvent incorporation treatment, whereby the crystal transition and the solvent incorporation are carried out, and the hydroxygallium phthalocyanine crystals containing the desired solvent can be obtained.

In the present invention, the polar organic solvent is selected from the group consisting of a compound having an amido group, a compound having a sulfoxide group, and an organic amine. Specific examples thereof include N,N-dimethylformamide, N,N-dimethylacetamide, N-methylpyrrolidone, and 1,3-dimethyl-2-imidazolidinone as the compound having an amido group; dimethyl sulfoxide and tetramethylene sulfoxide, as the compound having a sulfoxide group; and morpholine, piperidine, piperazine, and pipecoline; as the compound having an organic amine.

The polar organic solvents used at the production of the hydroxygallium phthalocyanine crystals may be used singly, as a mixture of two or more of them, or as a mixture of water and the polar organic solvent.

For the solvent incorporation treatment, for example, not only an ordinary recrystallization treatment but also the treatment operation such as washing, wet grinding, dipping, suspending with stirring, etc., can be employed.

The incorporated amount of the solvent into the crystals can be increased by increasing the shear stress applied to the crystals upon solvent incorporation treatment. For example, various treatments, such as washing, dipping, and suspending treatments, can be employed in addition to the normal recrystallization treatment. The amount of the solvent used in the solvent incorporation treatment is generally from 1 to 200 parts by weight, preferably from 10 to 100 parts by weight, per 1 part of the hydroxygallium phthalocyanine crystals. The temperature of the solvent treatment is generally from 0° to 150° C., preferably from room temperature to 100° C. The treating time for the solvent incorporation treatment is preferably at least 30 hours, particularly preferably from 30 to 50 hours.

While the solvent incorporation treatment can be carried out by letting the mixture of the crystal and the solvent alone or stirring the mixture, it is preferred from the standpoint of applying shear stress to the crystals that the crystals are wet-pulverized with the solvent by means of a ball mill, a mortar, a sand mill, a kneader, an attritor, etc. Upon wet-pulverizing, it is preferred to use inorganic compounds, e.g., sodium chloride and Glauber's salt, or pulverizing media, e.g., glass beads, steel beads, and alumina beads. The diameter of the pulverizing media is generally from 0.5 to 20 mm, preferably as relatively large as from 3 to 15 mm. Particularly preferably, pulverization is carried out in a ball mill using pulverizing media having a large diameter of from 5 to 10 mm for 30 to 40 hours, so that the solvent can be effectively incorporated in the crystals.

In the hydroxygallium phthalocyanine crystals of the present invention, the amount of the solvent incorporated in the crystals is generally larger than the calculated value of the physical adsorption amount on the surface of the crystals. It is considered therefore that the solvent is not only adsorbed on the surface of the crystals but also incorporated in the interior of the crystals.

The solvent incorporation treatment may be carried out together with a binder resin (such as a polyvinyl butyral resin, a polyvinyl formal resin, etc.) capable of being used for the charge generating layer of the electrophotographic photoreceptor described later. In this case, the treated product itself can be used as the coating composition for the charge generating layer.

By the solvent incorporation treatment as described above, preferred novel hydroxygallium phthalocyanine crystals having better crystalline property and a uniform particle size can be produced.

Hydroxygallium phthalocyanine crystals having distinct diffraction peaks at 7.5°, 9.9°, 12.5°, 16.3°, 18.6°, 25.1°, and 28.3° of the Bragg angle (2θ±0.2°) in the CuKα characteristic X-ray diffraction spectrum obtained by treating with other solvent than the above treating solvent (i.e., the compounds having an amido group, the compounds having a sulfoxide group, and the organic amines) can be used as a raw material. Such hydroxygallium phthalocyanine crystals can be subjected to the above-described solvent incorporation treatment to obtain the hydroxygallium phthalocyanine crystals according to the present invention, which has distinct diffraction peaks at 7.5°, 9.9°, 12.5°, 16.3°, 18.6°, 25.1°, and 28.3° of the Bragg angle (2θ±0.2°) in the CuKα characteristic X-ray diffraction spectrum and contain at least one of a compound having an amido group, a compound having a sulfoxide group, and an organic amine.

The content of the polar organic solvent contained in the hydroxygallium phthalocyanine crystals of the present invention is generally in the range of from 0.1 to 10% by weight, preferably from 0.5 to 5% by weight, and more preferably from 1 to 3% by weight, based on the amount of the hydroxygallium phthalocyanine crystals. The polar organic solvent described above is introduced into the hydroxygallium phthalocyanine crystals or is contained by being adsorbed on the surfaces of the crystals.

When the hydroxygallium phthalocyanine crystals containing the polar organic solvent described above are heated to about 200° C. which is higher than the boiling point of the polar organic solvent, the hydroxygallium phthalocyanine crystals are in a stable state without being separated and decomposed.

The solvent incorporated in the crystals can be determined by thermal analysis, infrared absorption spectrum, NMR analysis, etc., in which peaks ascribed to the incorporated solvent appear. For example, if crystals contain 3% by weight of dimethylsulfoxide, the results of thermal analysis show additional weight loss of 3% by weight in the range of about from 200° to 400° C., and peaks ascribed to dimethylsulfoxide appear in infrared absorption spectrum and NMR spectrum.

In organic and inorganic semiconductors such as phthalocyanine, doping of an impurity gives a large influence on the electric characteristics of the semiconductors, and it is also considered that in the hydroxygallium phthalocyanine crystals of the present invention, the foregoing polar organic solvent is introduced into the crystals or adsorbed on the surfaces of the crystals to function as a dopant, whereby a some interaction may occur between the molecules or the crystals to improve the electrophotographic characteristics.

An electrophotographic photoreceptor using the hydroxygallium phthalocyanine crystals according to the present invention is described in detail below.

In the electrophotographic photoreceptor of the present invention, the photosensitive layer may have a single layer structure or have a laminated layer structure the function of which is separated into a charge generating layer and a charge transport layer. When the photosensitive layer has the laminated layer structure, the hydroxygallium phthalocyanine crystals containing the polar organic solvent described above is contained in the charge generating layer.

In a preferred embodiment of the electrophotographic photoreceptor of the present invention, the photosensitive layer composed of the charge generating layer and the charge transport layer laminated thereon is formed on an electrically conductive support and a subbing layer is disposed between the photosensitive layer and the electrically conductive support.

The charge generating layer described above in the electrophotographic photoreceptor of the present invention is formed by dispersing the hydroxygallium phthalocyanine crystals, as the charge generating material, in a solution of a binder resin dissolved in an organic solvent to prepare a coating composition, and coating the composition on the electroconductive support.

Examples of the binder resin include various resins such as a polyvinylbutyral resin, a polyvinylformal resin, etc. The organic solvent used for dissolving the binder resin, it is preferably select from solvents that do not dissolve the subbing layer.

The compounding ratio of the foregoing solvent-containing hydroxygallium phthalocyanine crystals to the binder resin is preferably in the range of from 40/1 to 1/20 by weight.

As a method of dispersing the solvent-containing hydroxygallium phthalocyanine crystals to prepare a coating composition, ordinary methods such as a ball mill dispersing method, an attritor dispersing method, a sand mill dispersing method, etc., can be employed.

For coating the coating composition described above, ordinary coating methods such as a dip coating method, a spray coating method, a spinner coating method, a bead coating method, a wire bar coating method, a blade coating method, a roller coating method, an air knife coating method, a curtain coating method, etc., can be employed.

The thickness of the charge generating layer containing the solvent-containing hydroxygallium phthalocyanine crystals of the present invention is preferably from about 0.05 to 5 µm.

The charge transport layer in the electrophotographic photoreceptor of the present invention can be formed by coating a coating composition of a proper binder resin containing a charge transport material such as N,N'-diphenyl-bis-(m-tolyl)benzidine, 4-dimethylaminobenzaldehyde-2,2'-diphenylhydrazine, p-(2,2-diphenylvinyl)-N,N-diphenylaniline, etc.

As the binder resin used for the charge transport layer, the same binder resins used for forming the charge generating layer described above can be used.

For forming the charge transport layer, after preparing a coating composition of the charge transport material and the binder resin described above together with an organic solvent, the coating composition may be coated on the charge generating layer by the method same as the coating method described above. The compounding ratio of the charge transport material and the binder resin is preferably from 10/1 to 1/5 by weight. The thickness of the charge transport layer is generally in the range of from 5 to 50 µm.

When the photosensitive layer of the electrophotographic photoreceptor of the present invention has a single layer structure, the photosensitive layer may comprise a photoconductive layer comprising a charge transport material and a binder resin having dispersed therein the hydroxygallium phthalocyanine crystals of the present invention. As the charge transport material and the binder resin, the same materials as the case that the photosensitive layer has the laminated structure described above can be used, and the photoconductive layer can be formed according to the coating method as described above. The compounding ratio of the charge transport material to the binder resin is generally in the range of from about 1/10 to 10/1 by weight, and preferably from about 1/2 to 2/1 by weight. The compounding ratio of the hydroxygallium phthlocyanine crystals to the binder resin is generally in the range of from 1/100 to 5/1, and preferably from 1/10 to 1/1.

As the electroconductive support, any materials which can be used as the electroconductive supports for electrophotographic photoreceptors can be used.

In the electrophotographic photoreceptor of the present invention, a subbing layer comprising a polyamide resin, a polycarbonate resin, a zirconium chelating compound, a titanyl chelating compound, etc., may be disposed between the electroconductive support and the photosensitive layer for preventing the injection of unnecessary charges into the photosensitive layer from the electroconductive support at electrostatically charging the photosensitive layer.

Furthermore, if necessary, a protective layer for coating the surface of the photosensitive layer may be provided. When the photosensitive layer has the laminated layer structure, the protective layer prevents the occurrence of the chemical change of the properties of the charge transport layer at electrostatic charging and also functions to improve the mechanical strength of the photosensitive layer.

The present invention will be described in more detail by referring to the following Examples and Comparative Examples, but the present invention is not construed as being limited thereto. In the following Examples and Comparative Examples, all parts, percents, ratios and the like are by weight unless otherwise indicated.

Production of Hydroxygallium Phthalocyanine as Raw Material

A mixture of 29.1 parts of phthalonitrile, 9.2 parts of gallium trimethoxide, and 150 parts of ethylene glycol was stirred for 24 hours at 200° C. in a nitrogen atmosphere, and the product was filtered. The product was successively washed with N,N-dimethylformamide and then methanol, and dried to provide 23.0 parts of gallium phthalocyanine.

10 parts of the gallium phthalocyanine thus obtained was dissolved in 250 parts of concentrated sulfuric acid followed by stirring for 2 hours, and the mixture was added dropwise to a mixed solution of 870 parts of ice-cooled distilled water and 530 parts of concentrated aqueous ammonia solution to precipitate crystals. The crystal precipitated were collected, sufficiently washed with distilled water, and dried to provide 9 parts of hydroxygallium phthalocyanine crystals. The powder X-ray diffraction spectrum of the crystals is shown in FIG. 1.

EXAMPLE 1

Figure 2:
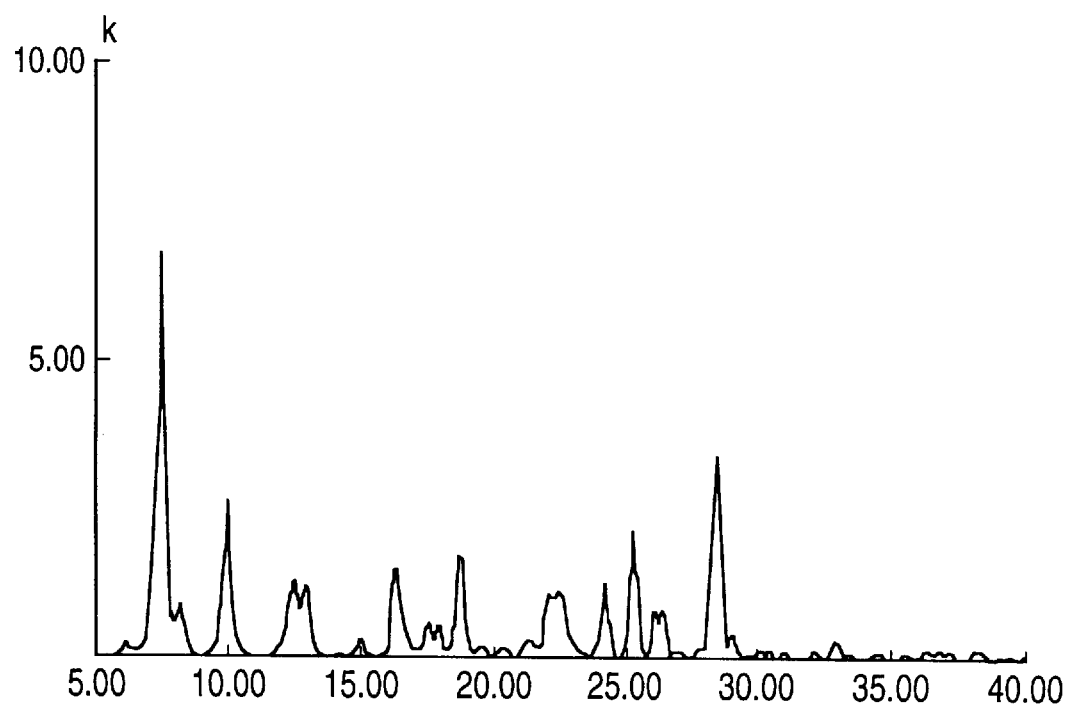
FIG. 2 shows the powder X-ray diffraction spectrum of the hydroxygallium phthalocyanine crystals obtained in Example 1.
Figure 3:
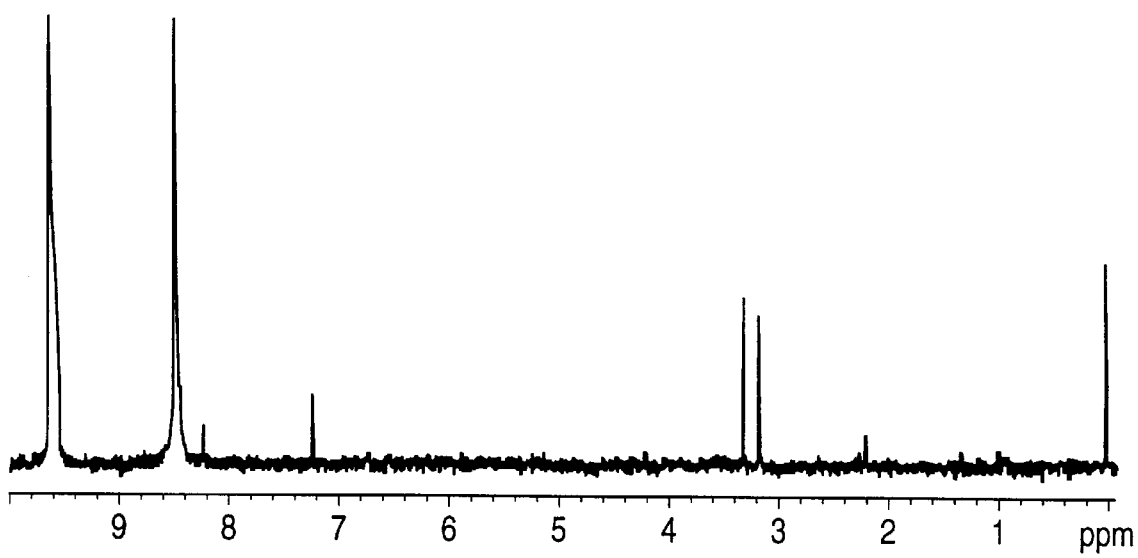
FIG. 3 shows the NMR spectrum of the hydroxygallium phthalocyanine crystals obtained in Example 1.

2.5 parts of the hydroxygallium phthalocyanine obtained above as a raw material was milled together with 19 parts of N,N-dimethylformamide and 50 parts of glass beads having a diameter of 5 mm for 48 hours. The crystals were separated, washed with n-butyl acetate, and dried for 8 hours at 50° C. under a reduced pressure of 20 Pa to remove the remaining solvent, thereby 2.4 parts of hydroxygallium phthalocyanine crystals were obtained. The powder X-ray diffraction spectrum of the crystals is shown in FIG. 2. The NMR spectrum in the case of dissolving the hydroxygallium phthalocyanine thus obtained in a mixed solution (1/1) of deutero trifluoroacetic acid and deutero chloroform is shown in FIG. 3. The crystals had the peaks corresponding to N,N-dimethylformamide, the proton ratio of hydroxygallium phthalocyanine to N,N-diemthylformamide was 44/3, and the weight content of N,N-dimethylformamide was 2.1%.

Figure 6:
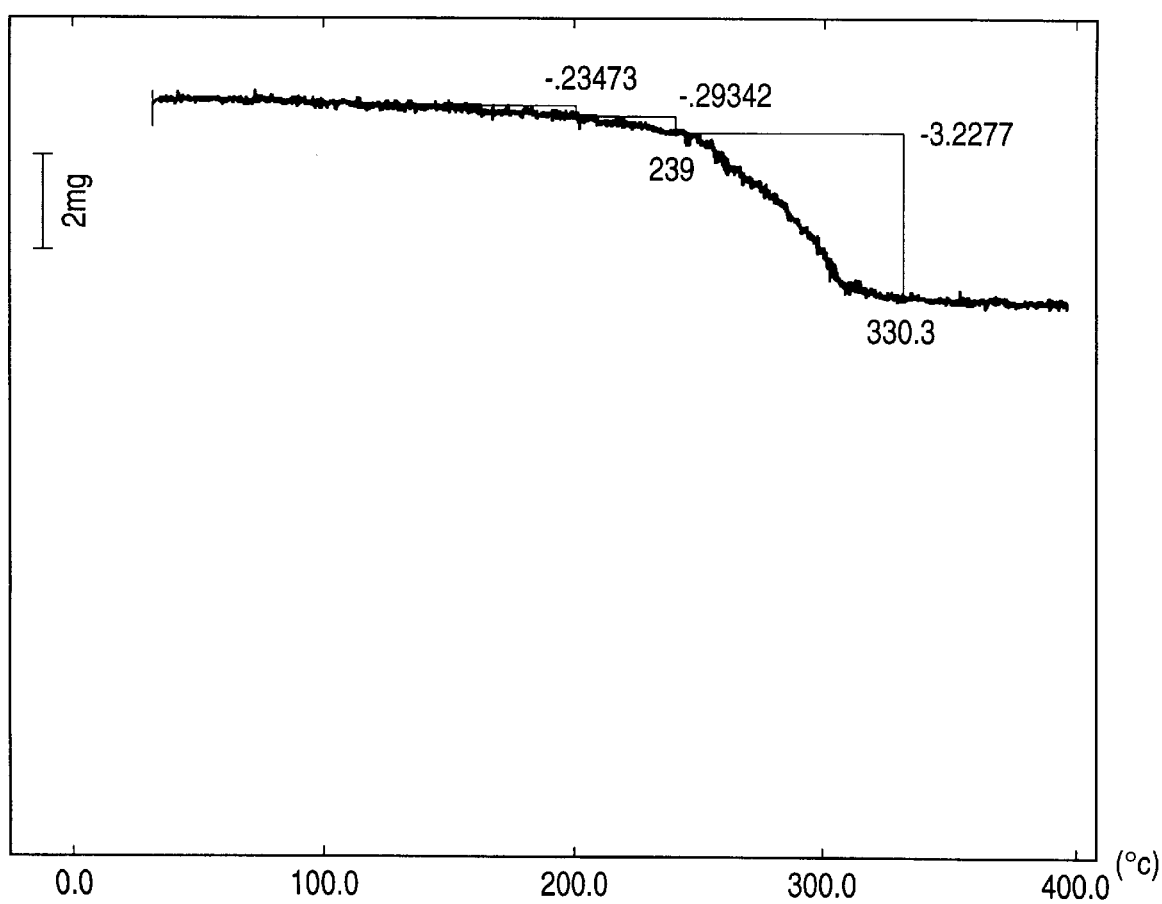
FIG. 6 shows showing the result of the thermogravimetric analysis of the hydroxygallium phthalocyanine crystals obtained in Example 1.

The result of the thermogravimetric analysis of the crystals obtained is shown in FIG. 6. The measurement was carried out by using DT-40 (trade name, manufactured by Shimadzu Corporation) at a temperature-raising rate of 10° C./minute. The weight loss of the crystals mainly started at about 200° C., which was higher than the boiling point of N,N-dimethylformamide (153° C.). It is considered that there occurs some interaction between N,N-dimethylformamide and the phthalocyanine ring.

About 1.5% of the weight loss was based on water, which was the result of the dehydration reaction of the two molecules of hydroxygallium phthalocyanine. Accordingly, the weight loss of about 2% corresponded to N,N-dimethylformamide, which almost coincided with the content calculated from the results of NMR.

EXAMPLES 2 TO 4

Figure 4:
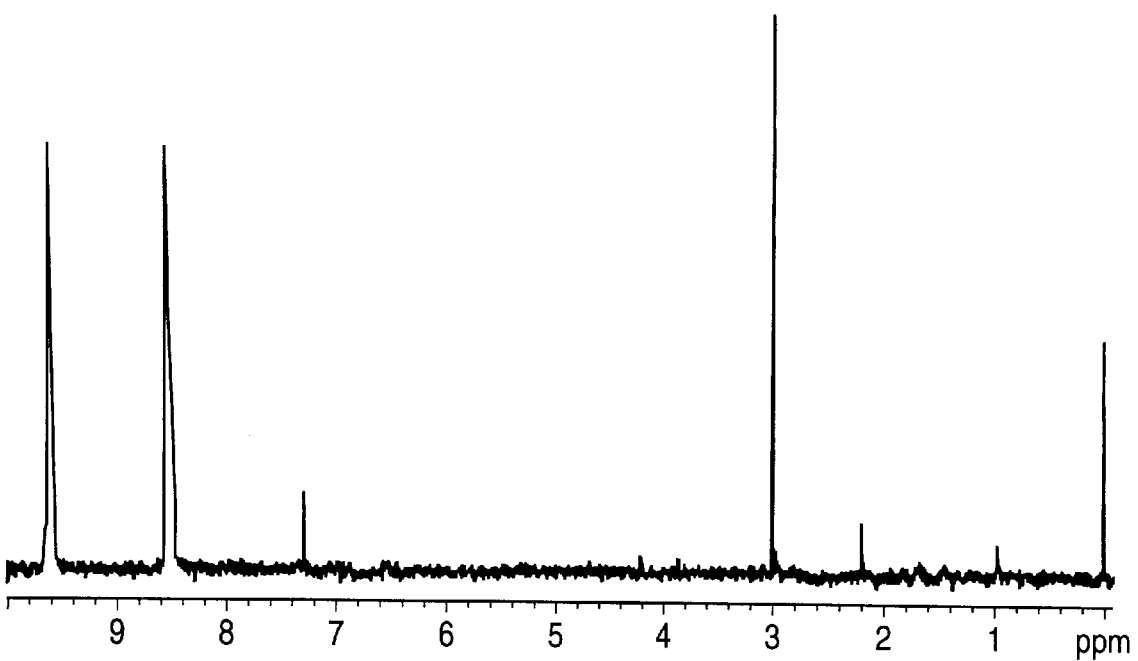
FIG. 4 shows the NMR spectrum of the hydroxygallium phthalocyanine crystals obtained in Example 2.
Figure 5:
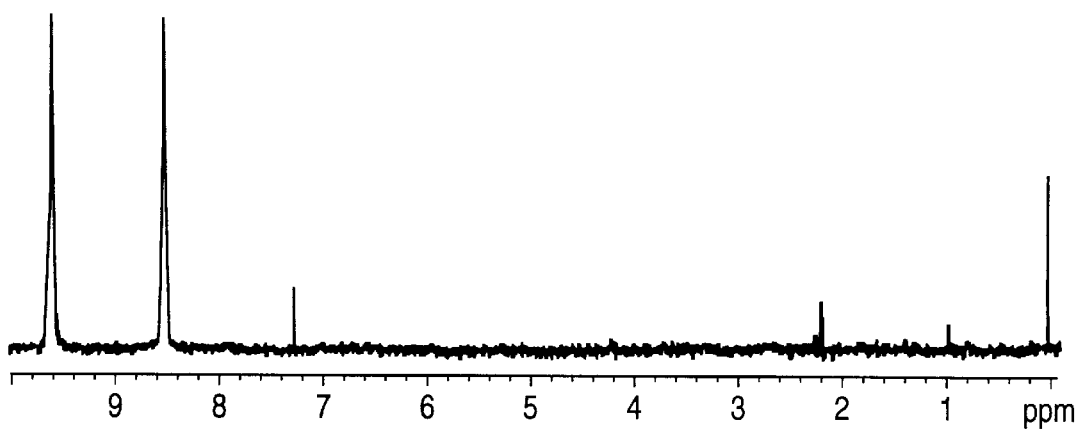
FIG. 5 shows the NMR spectrum of the hydroxygallium phthalocyanine crystals obtained in Comparative Example 1.

4 parts of the hydroxygallium phthalocyanine crystal obtained above as a raw material was milled together with 50 parts of each of the organic solvents shown in Table 1 below and 120 parts of glass beads having a diameter of 5 mm for 48 hours. The crystals were dried for 8 hours at 50° C. under a reduced pressure of 20 Pa to remove the remaining solvent, thereby 3.9 parts of each of the hydroxygallium phthalocyanine crystals was obtained. The powder X-ray diffraction spectra of these crystals were all same as the powder X-ray diffraction spectrum shown in FIG. 2. The NMR spectrum in the case of dissolving each of the hydroxygallium phthalocyanine crystals obtained in Example 2 in a mixed solution (1/1) of deutero trifluoroacetic acid and deutero chloroform is shown in FIG. 4.

In Example 2, the hydroxygallium phthalocyanine crystals had the peaks corresponding to dimethyl sulfoxide, the proton ratio of the hydroxygallium phthalocyanine to dimethyl sulfoxide was 40/3, and the weight content of dimethyl sulfoxide was 2.5%. In Example 3, the proton ratio of the dihydroxygallium phthalocyanine to the morpholine was 108/11, and the weight content of morpholine was 2.8%. In Example 4, the proton ratio of the hydroxygallium phthalocyanine, the morpholine and the dimethyl sulfoxide was 98/3/6, and the total weight content of the solvent was 2.92%.

TABLE 1

| Example | Solvent |
| --- | --- |
| Example 2 | Dimethyl sulfoxide |
| Example 3 | Morpholine |
| Example 4 | Mixed solution (5/95 by volume ratio of morpholine and dimethyl sulfoxide) |

EXAMPLES 5 TO 8

A solution composed of 10 parts of a zirconium compound (Orgatix ZC540, trade name, made by Matsumoto Seiyaku K.K.), 1 part of a silane compound (A1110, trade name, made by Nippon Unicar K.K.), 40 parts of i-propanol, and 20 parts of butanol was coated on an aluminum support by a dip coating method and dried by heating to 150° C. for 10 minutes to form a subbing layer of 0.2 μm thick.

1 part of each of the hydroxygallium phthalocyanine crystals obtained in Examples 1 to 4 was mixed with 1 part of polyvinyl butyral (S-Lec BM-S, trade name, made by Sekisui Chemical Co., Ltd.) and 100 parts of n-butanol and the mixture was dispersed together with glass beads by a paint shaker for one hour. The coating composition obtained was coated on the foregoing subbing layer by a dip coating method and dried by heating to 100° C. for 10 minutes to form a charge generating layer of about 0.2 μm thick.

2 parts of the charge transport material shown by following structural formula (I) and 3 parts of the polycarbonate resin having a repeating unit shown by following structural formula (II) were dissolved in 20 parts of chloroform and a coating composition obtained was coated on the charge generating layer formed on the aluminum support by a dip coating method, and dried by heating to 120° C. for one hour to form a charge transport layer of 20 μm thick.

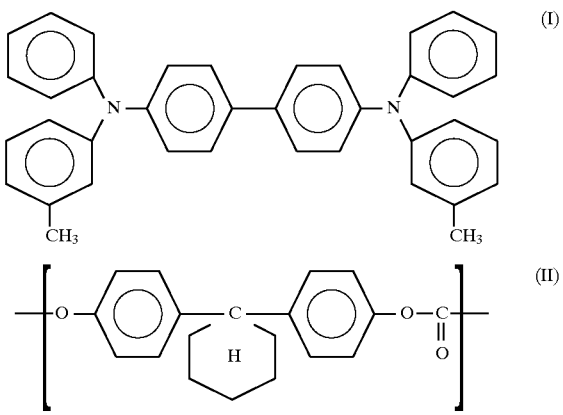

The electrophotographic characteristics of each electrophotographic photoreceptor thus obtained were measured as follows.

The photoreceptor was electrostatically charged at the initial surface potential of −800 (V) by corona discharging under the circumstance of normal temperature and normal humidity (20° C., 40% RH) using a universal scanner. After allowing to stand the photoreceptor thus charged for 0.538 second, VDDP (V) was measured, and the dark decay VDDR (V) (VDDP-(−800)) was calculated. The light of a tungsten lamp was converted into a monochromatic light of 780 nm using a monochrometer. The surface of the photoreceptor was irradiated by the monochromatic light, and the initial sensitivity dV/dE (KVm$^2$/J) was measured. The results obtained are shown in Table 2 below.

Comparative Example 1

1 part of the hydroxygallium phthalocyanine crystals obtained above as a raw material was stirred with heating together with 15 parts of n-butyl acetate for 5 hours at 100° C. The crystals were separated and dried for 8 hours at 50° C. under a reduced pressure of 20 Pa to remove the remaining solvent, thereby 0.9 part of the hydroxygallium phthalocyanine crystals were obtained. The powder X-ray diffraction spectrum of the crystals was same as that shown in FIG. 2. The NMR spectrum in the case of dissolving the hydroxygallium phthalocyanine crystals thus obtained in a mixed solution (1/1) of deutero trifluoroacetic acid and deutero chloroform. The crystals had substantially no peaks other than the peaks corresponding to phthalocyanine.

Comparative Example 2

By following the same procedure as Example 5 except that the hydroxygallium phthalocyanine crystals obtained in Comparative Example 1 were used, an electrophotographic photoreceptor was prepared and the electrophotographic characteristics of the electrophotographic photoreceptor were measured by the same manner as above. The results obtained are shown in Table 2 below.

TABLE 2

| | Gallium phthalocyanine used | VDDP (V) | VDDR (V) | dV/dE (kVm$^2$/J) |
| --- | --- | --- | --- | --- |
| Example 5 | Example 1 | −768 | 32 | 331 |
| Example 6 | Example 2 | −765 | 35 | 374 |
| Example 7 | Example 3 | −783 | 17 | 260 |
| Example 8 | Example 4 | −779 | 21 | 297 |
| Comparative Example 2 | Comparative Example 1 | −731 | 69 | 191 |

The solvent-containing hydroxygallium phthalocyanine crystals of the present invention are used as a photoconductive material and are useful for producing an electrophotographic photoreceptor having a high photosensitivity and a low dark decay ratio. The electrophotographic photoreceptor obtained by using the solvent-containing hydroxygallium phthalocyanine crystals of the present invention forms images of excellent quality in the case of using for a printer utilizing a semiconductor laser, and the like.

While the invention has been described in detail and with reference to specific examples thereof, it will be apparent to one skilled in the art that various changes and modifications can be made therein without departing from the spirit and scope thereof.

What is claimed is:

1. Hydroxygallium phthalocyanine crystals containing at least one of a polar organic solvent selected from the group consisting of a compound having an amido group, a compound having a sulfoxide group, and an organic amine, said crystals containing within their interior said at least one polar organic solvent in an amount of from 0.5 to 5 % by weight based on the amount of said crystals.

2. Hydroxygallium phthalocyanine crystals of claim 1, wherein said crystals have distinct diffraction peaks at 7.5°, 9.9°, 12.5°, 16.3°, 18.6°, 25.1°, and 28.3° of the Bragg angle ($2\theta\pm0.2°$) in the CuKα characteristic X-ray diffraction spectrum.

3. Hydroxygallium phthalocyanine crystals of claim 1, wherein said polar organic solvent is selected from the group consisting of a compound having an amido group and an organic amine.

4. Hydroxygallium phthalocyanine crystals of claim 1, wherein said polar organic solvent is selected from the group consisting of N,N-dimethylformamide, N,N-dimethylacetamide, N-methylpyrrolidone, 1,3-dimethyl-2-imidazolidinone, dimethyl sulfoxide, tetramethylene sulfoxide, morpholine, piperidine, piperazine, and pipecoline.

5. Hydroxygallium phthalocyanine crystals of claim 4, wherein said polar organic solvent is selected from the group consisting of N,N-dimethylformamide, dimethyl sulfoxide, and morpholine.

6. Hydroxygallium phthalocyanine crystals of claim 1 made by a process comprising the steps of:

forming a mixture of hydroxygallium phthalocyanine crystals, at least one of a polar organic solvent selected from the group consisting of a compound having an amido group, a compound having a sulfoxide group and an organic amine, and pulverizing media; and subjecting said mixture to a pulverizing treatment for at least 30 hours.

7. Hydroxygallium phthalocyanine crystals of claim 1, wherein said crystals contain said polar organic solvent in an amount of from 1 to 3% by weight based on the amount of said crystals.

8. Hydroxygallium phthalocyanine crystals of claim 1, wherein said crystals are in a stable state, without being separated and decomposed, when heated to a temperature that is higher than a boiling point temperature of said at least one polar organic solvent.

9. An electrophotographic photo-receptor comprising an electroconductive support having thereon a photosensitive layer, said photosensitive layer comprising hydroxygallium phthalocyanine crystals containing at least one of a polar organic solvent selected from the group consisting of a compound having an amido group, a compound having a sulfoxide group, and an organic amine, as a charge generating material, said crystals containing within their interior said at least one polar organic solvent in an amount of from 0.5 to 5 % by weight based on the amount of said crystals.

* * * * *